Sept. 6, 1966 R. KRÄMER 3,271,518
DISTORTION CORRECTION OF TELEPRINTER SYMBOLS
Filed July 6, 1961
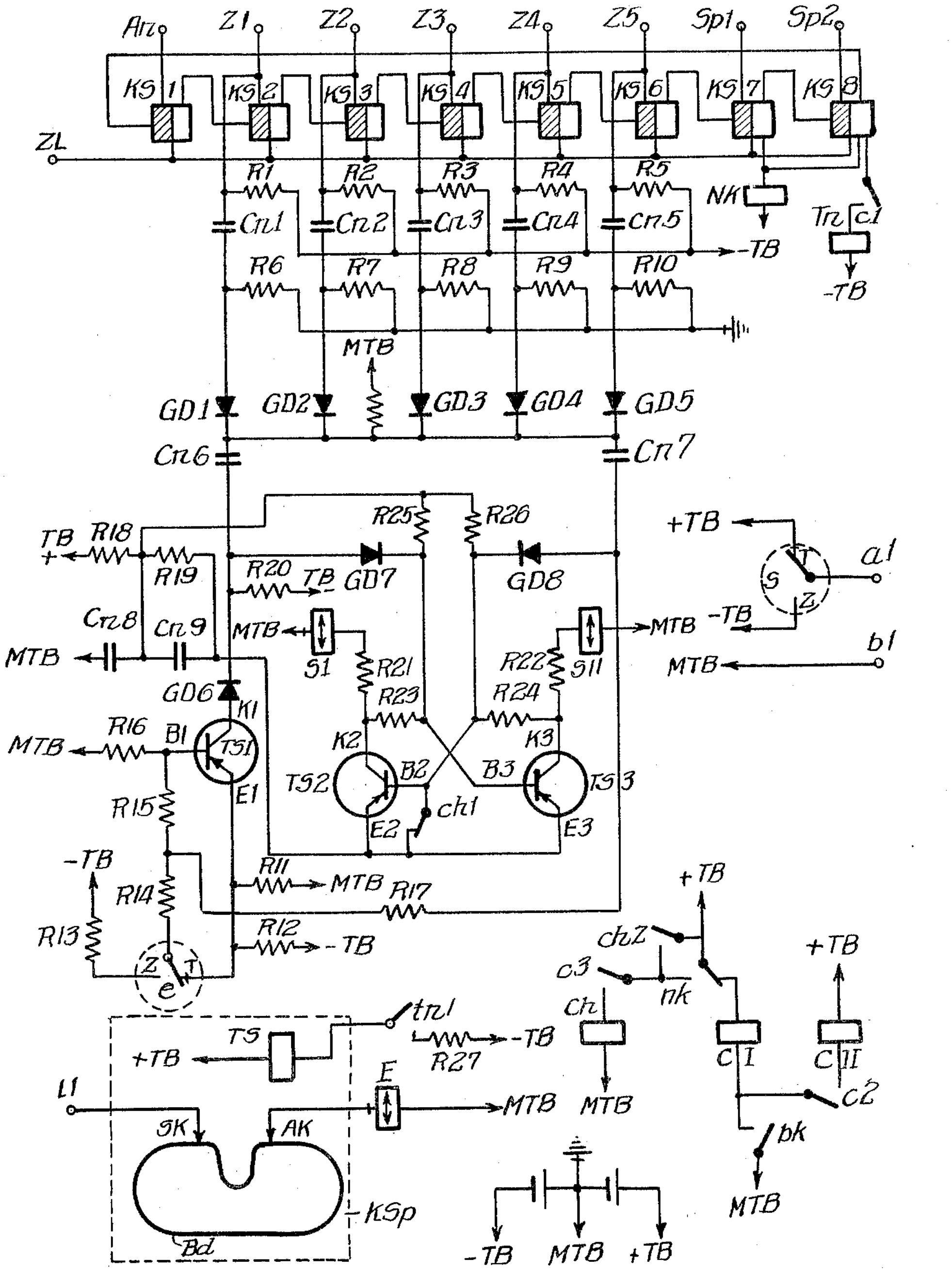
INVENTOR.
Rudolf Krämer,
BY [signature]
atty United States Patent Office 3,271,518

Patented Sept. 6, 1966

3,271,518

DISTORTION CORRECTION OF TELEPRINTER SYMBOLS

Rudolf Krämer, Munich, Germany, assignor to Siemens & Halske Aktiengesellschaft Berlin and Munich, a German corporation Filed July 6, 1961, Ser. No. 122,249
Claims priority, application Germany, July 7, 1960, S 69,265
9 Claims. (Cl. 178—53.1)

This invention is concerned with a circuit arrangement for teleprinter systems having a central element shaper and circuit means for correcting the distortion of teleprinter symbols by center scanning of the individual teleprinter symbol elements.

It is known in the teleprinter art to correct distorted teleprinter symbols by the provision of circuit means which are operative to scan or to sample the received teleprinter symbols during a time interval lying midway of each element, which interval is short as compared with the entire element length, whereupon the scanned or sampled potential is transferred to the transmitter circuit means which retain always for the entire element length the potential condition transferred thereto (space current or mark current condition). Mechanical as well as electronic timers are known for obtaining the scanning or sampling pattern, that is, the short scanning or sampling time intervals lying midway of each element.

The mechanical timer usually comprises a cam shaft driven by a motor and rotating with a given speed of rotation, such shaft being started in operation with each start element and stopped coincident with each stop element. The control cams disposed upon the shaft actuate during a revolution the individual scanning or sampling contacts which are in turn effective to determine the scanning or sampling pattern.

Electronic timers usually comprise a plurality of oscillating stages, one of which determines, for example, the spacing between scanning while the other determines the scanning time. The transmission of the scanned potential to the transmitter means can be effected as in connection with distortion correction devices operating with mechanical timers. In case the stop element is to be automatically inserted at the end of each teleprinter symbol, the electronic timer is usually provided with a third oscillating stage which determines the entire length of a teleprinter combination.

It was until now necessary, in view of the displacement, in time, of a plurality of messages arriving at an exchange over a line, to provide for each line an individual distortion correction device with a timer cooperatively associated therewith. This known distortion correction control requires in the exchanges a great expenditure so far as the timers are concerned.

The object of the invention is to provide a circuit arrangement for teleprinter systems, with switching means for the distortion correction of teleprinter symbols by center sampling or scanning, which reduces considerably the expenditure connected with timers for obtaining the sampling or scanning pattern.

In order to solve the problems involved, the invention proceeds from the thought to provide first for an equalization of the staggering, in time, of the individual messages, by a temporary storer, and to determine the scanning or sampling pattern by a common central element shaper, which is preferably provided in the exchange, for short messages, for example, time informations or name identifying texts.

In accordance with the invention, this object is accomplished by obtaining by the use of differentiating switching means, from the timing pulse supplied by the central element shaper, the pulses of which correspond respectively to a teleprinter symbol element, a control pulse, each control pulse having the length of a scanning interval, and by providing for the incoming teleprinter symbols the distortion of which is to be corrected, a temporary storer with a minimum capacity of the length of a teleprinter symbol, and by making the control of this temporary storer dependent upon the central element shaper, in such a manner, that the control pulse is effective to cause the scanning switching means of the temporary storer to become with respect to the transmitter switching means operatively effective always only during the scanning or sampling time which lies midway of a symbol element.

The advantage of the invention resides in the fact that it is thereby made possible to control a plurality of distortion correctors which are respectively assigned to individual lines, by a central element shaper or element former which is at any rate provided in the exchange. The invention can be employed with particular advantage in connection with extensions wherein each incoming and each outgoing line is provided respectively with a receiving storer or transmitter storers which can thus be utilized as a temporary storer for the equalization of the time displacement of the individual incoming messages with respect to the timing rhythms of the central element shaper.

Further objects, features and details will appear from the description of an embodiment which is rendered below with reference to the accompanying drawing.

The upper part of the drawing illustrates a central element shaper which is, for example, constructed of bistable flip-flop stages KS1, KS2 . . . KS8. In the lower part of the drawing is represented the temporary storer KS*p* containing the message the distortion of which is to be corrected, such storer comprising, noting the principles involved, the recording head SK, the scanning or pickup head AK, the storage carrier B*d*, and the advance magnet TS. The scanning head AK causes energization of the receiving relay E, according respectively to space and mark action, relay E in turn switching its contact *e* (lower left of the drawing) into the respective space or mark position indicated respectively by T (space) and Z (mark). So-called shift registers which are constructed of magnet cores or flip-flop stages may be employed within the scope of the invention in place of the illustrated temporary storer. At the right center of the drawing is shown the transmitter contact *s* which transmits the corrected messages to the line *a*1 and *b*1.

Between the contact *e* which scans a message and the transmitter or sender contact *s* is provided a bistable flip-flop circuit comprising transistors TS2 and TS3, in the output circuit of which are respectively disposed the windings SI and SII belonging to a transmitter or sender relay which controls the operation of the transmitter or sender contact *s*. Between the scanning contact *e* and the input of the bistable flip-flop circuit is provided a potential inversion circuit formed by the transistor TS1.

To each stage of the central element shaper is connected switching means which differentiate the inception or start of each teleprinter symbol element; for example, to the stage KS2 are connected the resistors R1 and R6 and the capacitor C*n*1. The respective differentiating switching or circuit means are connected to the bistable flip-flop circuit TS2, TS3, over rectifiers GD1 . . . GD5. The differentiating circuit means for the flip-flop stages KS1, KS7 and KS8, which determine the start element and the stop element, have been omitted for the sake of simplification. It is within the scope of the invention possible to insert the start and stop elements automatically in well known manner.

The operation of the circuit shown in the drawing is as follows:

The contact *ch*1 (right of transistor TS2) is normally closed as shown in the drawing. The base B2 and the emitter E2 of the transistor TS2 are thereby placed on the same potential and the transistor TS2 is accordingly at cutoff. However, at the emitter E3 of the transistor TS3 will be a potential of about +20 volt, over the voltage divider R18, R19, R22 and winding SII of the transmitter relay, while a more negative potential with respect to the emitter E3, will be at the base B3, supplied over the voltage divider formed by the resistors R18, R25, R23, R21 and the winding SI of the transmitter relay. Since the emitter potential at the transistor TS3 is more positive than the base potential, the transistor TS3 will be conductive and there will flow an emitter-base current and also an emitter-collector current. The emitter-collector current flowing through the transistor TS3 energizes the sender or transmitter relay over its winding SII, to be actuated to the space side, and the transmitter or sender contact *s* will accordingly be in the illustrated space position T.

The receiver contact *e* is normally in the illustrated space position T and is thus connected over the voltage divider formed by the resistors R11 and R12, to the negative bias potential of about −40 volt for the emitter E1 of the transistor TS1, whereby about two-thirds of such bias voltage is extended to the voltage divider formed by the resistors R14, R15, R16 as a base voltage for the transistor TS1. The base B1 of the transistor TS1 is accordingly more positive than the emitter E1 and this transistor is at cutoff.

The potential at the input diode GD7 of the bistable flip-flop circuit is determined by the magnitude of −60 volt of the telegraph battery, while the potential at the other input diode GD8 is determined by the voltage dividers R11, F[12], for example, −24 volts, which is extended over the receiver contact *e* as well as over the resistors R14, R17. Accordingly, the capacitor C*n*6 is charged to −60 volt and the capacitor C*n*7 is charged to −24 volt. However, both input diodes GD7 and GD8 are still at cutoff due to the positive base voltage of about 20 volt which lies at the other sides thereof.

The central element shaper shown in the upper part of the drawing, and comprising the bistable flip-flop circuit KS1 . . . KS8, is controlled over the counting line ZL, that is, one flip-flop stage is every 20 milliseconds triggered into one position, for example, into the 1 position, while the preceding flip-flop stage is triggered back to the zero position. This determines the start and the length of each teleprinter symbol element. At each element start which is, for example, determined by the flip-flop stage KS2, the potential of the capacitor C*n*1, which had been charged over the resistors R1 and R6, is raised, such capacitor discharging over the diode GD1 to the capacitors C*n*6 and C*n*7. The capacitors C*n*2 to C*n*5 cooperating with the resistors R2 to R10, perform the same functions in connection with the element starts determined by the respective flip-flop stages KS1 to KS8.

The charge of the capacitor C*n*6 to −60 volt, as has been described above for the normal condition, corresponds to the positive charge coming from the capacitor C*n*1, and the charges on the capacitors C*n*1 and C*n*6 are accordingly complementary. However, the capacitor C*n*7 is, as already described, charged to only −24 volt, and is consequently recharged to the difference amount of +36 volt. The input diode GD8 is thereby made conductive and a positive control pulse is for the time of a center scanning conducted to the bistable flip-flop circuit. However, such control pulse can not become effective so long as the contact *ch*1 is closed. The advantage resulting therefrom is that a distortion corrector especially assigned to a line remains blocked while the central element shaper is in operation.

However, if the line to which the distortion corrector is assigned, is occupied, relay C (bottom right in the drawing) will be energized by the closure of the seizure contact *bk*, in a circuit extending from MTB, over *bk*, CI, *nk* to +TB, and contacts *c*1 (top right in the drawing), *c*2 and *c*3 (bottom right in the drawing), will be placed in alternate positions. The relay C can however be energized only with the contact *nk* in the position shown, that is, only when the relay NK, which is connected to the flip-flop stage KS7 and KS8 which determines the stop element, is deenergized, that is, when the central element shaper does not transmit a stop element. The relay C will thus energize over the above noted circuit so long as the central element shaper is in a phase other than the stop element position, and will at its contacts *c*1 and *c*3 prepare the respective energizing circuits for the relay T*n* and the relay C*h*, while closing at its contact *c*2 a holding circuit for itself extending over its winding CII, which holding circuit is independent of the contact *nk*.

Upon marking of a stop element start by the central element shaper, the relay C*h* will instantly operatively energize in a circuit extending from MTB, C*h*, *c*3, *nk* to +TB, while the relay T*n* energizes over the flip-flop stages KS8, 10 milliseconds before termination of the entire stop element, that is, with a stop element of 30 milliseconds duration, 20 milliseconds after the start of the stop element.

In case the system operates, as compared with the assumed example, with a dual stop element, the relay T*n* will have to be energized, over a delay member, 10 milliseconds prior to the conclusion of the respective stop element. The value of 10 milliseconds for the energizazation of the relay T*n* applies only to systems with a telegraph speed of 50 baud. Appropriate measures are to be applied in the case of other telegraph speeds.

Responsive to actuation of relay T*n*, its contact *tn*1 closes the energizing circuit for the advance magnet TS (bottom left in the drawing) in a circuit extending from +TB, TS, *tn*1, resistor R27 to −TB, and the previously mentioned temporary storer now begins to release the received teleprinter symbols. Relay C*h*, upon energization thereof, has opened its contact *ch*1, thereby freeing the transistor TS2, which had been blocked, for one impulse control operation.

The temporary storer needs in the case of incoming lines only a minimum capacity corresponding to one teleprinter symbol because the time from the instant of seizure of the line to the switching-in of the advance magnet can amount at the most to the length of a telegraph symbol. In systems operating with storers, an input storer or an intermediate storer or a transmitter storer may be advantageously used as a temporary storer.

The control pulses derived from the element start effected by the central element shaper determine, due to the switching-in of the advance magnet TS, 10 milliseconds prior to conclusion of the stop element, the respective element center with regard to the storing carrier which is being transported by the action of the advance magnet TS.

However, the determination of the element center could within the scope of the invention also be effected by starting the advance of the temporary storer at the beginning of a start element determined by the element shaper, and by delaying by one half element length the control pulse sequences for the bistable flip-flop circuit respectively differentiated from the element start of the central element shaper.

When the receiver contact *e* is by the action of the first scanned element potential held in the space position T, the potential conditions at the transistors TS1, TS2, TS3 will be as described, the only change being that the transistor TS2 is not held at cutoff by the closed contact *ch*1 but by the potential tapped at its base from the voltage divider R24, R26, which is more positive than its emitter potential.

However, when the receiver contact *e* is by the action of a scanned element potential switched into the mark position Z, the potential at the base of the transistor TS1 will amount to about −40 volt, that on the emitter of the transistor TS1 now as before to −24 volt, and the patential at the input of the diode GD8 will be −60 volt. The transistor TS1 thus becomes conductive and about −24 volt will therefore appear at the input of the diode GD7 and at the capacitor C*n*6.

Both diodes GD7 and GD8 remain at cutoff until the potential at the input of the diode GD7 is, by the control pulse obtained from the element start of the element shaper, raised to +36 volt. The bistable flip-flop circuit will then switch over, that is, the transistor TS2 will become conductive and the transistor TS3 will switch to cutoff. The emitter-collector current flowing through the transistor TS2 energizes the transmitter relay over its winding SI, such relay actuating its transmitter contact *s* to the mark position Z and thereby effecting corrected distortion-free transmission of the mark element scanned by the receiver contact *e* of the temporary storer.

A further advantage of the invention is that it does not only equalize or compensate delays of the teleprinter symbol elements occurring up to the temporary storer, but that it also eliminates distortions caused in the temporary storer by tape expansion or shrinking or by drive fluctuations due to temperature changes.

The invention is not inherently limited to the described and illustrated example, comprising flip-flop stages constructed of an electronic timer and transistors, but can also be used in connection with central element shapers constructed in accordance with electromechanical principles and having bistable flip-flop stages employing customary tubes. The invention may also be realized by using a central element shaper which is included in a system as a matter of course, for example, an element shaper of an available short-text transmitter or a control element shaper which is provided for all distortion correctors.

Changes may be made within the scope and spirit of the appended claims which define what is believed to be new and desired to have protected by Letters Patent.

I claim:

1. In a teleprinter system for start-stop telegraphy, a circuit arrangement for correcting distorted teleprinter symbols of a plurality of teleprinter messages which are respectively transmitted over separate lines, wherein the correcting is effected with the aid of center sampling of the individual teleprinter symbol elements, the combination of storage feed-in means allocated to each line, an intermediate storer operatively connected with each of said storage feed-in means and adapted to store at least one complete teleprinter symbol, means for conducting incoming teleprinter signals to said storage feed-in means for the storage thereof in said intermediate storer, storage feed-out means for each intermediate storer operatively connected thereto, a centrally disposed element former having means for delivering sampling pulses operative for the center sampling of the symbol elements, and means operatively connected to said element former and controlled by said element former, operable for the duration of the seizure of the respective intermediate storers, for operatively releasing the corresponding storage feed-out means of the respective intermediate storers at instants defined with respect to the position of the start element formed by the central element former.

2. A circuit arrangement according to claim 1, comprising differentiating circuit means operatively connected to said central element former for producing, from the inception of the element start determined by the central element former, control pulses, each with the length of a sampling time, and an advance magnet operatively connected to said intermediate storer, said advance magnet being controlled by the respective control pulses and operatively actuated thereby one-half element length prior to the start of a cycle determined by said central element former.

3. A circuit arrangement according to claim 1, comprising differentiating circuit means operatively connected to said central element former for producing, from the inception of the element start determined by the central element former, control pulses, each with the length of a sampling time, means for delaying the respective control pulses by one-half element length, an advance magnet operatively connected to said intermediate storer, and means operatively connecting said central element former and said advance magnet for operatively actuating said advance magnet synchronously with the start of a new cycle initiated by said central element former.

4. A circuit arrangement according to claim 1, comprising, for the transmission of corrected teleprinter signals, a transmitter relay having two windings, a bistable flip-flop circuit having two outputs, means for connecting the respective windings of said transmitter relay each with an output of said flip-flop circuit, and means for controlling said flip-flop circuit by the sum of the potential of a control pulse produced by said central element former and a sampled element potential.

5. A circuit arrangement according to claim 4, comprising potential inversion means disposed between the input of said bistable flip-flop circuit and the sampling circuit of the intermediate storer.

6. A circuit arrangement according to claim 2, wherein said central element former comprises a plurality of stages, a control relay operatively governed by the final stage of said central element former, and contact means governed by said control relay, said contact means being disposed in the energizing circuit of the advance magnet of said intermediate storer.

7. A circuit arrangement according to claim 6, comprising blocking circuit means respectively cooperably associated with said bistable flip-flop circuit and a relay for governing the operation of said advance magnet, said blocking means being operable to permit the transmission of a stored teleprinter signal only upon conclusion of an operating cycle by said control element former.

8. A circuit arrangement according to claim 7, wherein said bistable flip-flop circuit is continuously connected with said central element former, said blocking circuit means being operative to release the operative actuation of said flip-flop circuit only upon seizure thereof.

9. A circuit arrangement according to claim 1, comprising a shift register constituting said intermediate storer.

References Cited by the Examiner

UNITED STATES PATENTS

| | | | |
|---|---|---|---|
| 2,749,386 | 6/1956 | Wright | 178—70 |
| 2,752,425 | 6/1956 | Dain | 178—70 |
| 2,805,278 | 9/1957 | Van Duuren | 178—53.1 |
| 2,833,858 | 5/1958 | Grondin | 178—70 |
| 2,850,567 | 9/1958 | Snijders | 178—53.1 |
| 2,879,334 | 9/1959 | Snijders | 178—53.1 |
| 2,968,693 | 1/1961 | Gaffney et al. | 178—53.1 |
| 3,008,006 | 11/1961 | Van Berkel | 178—70 |
| 3,051,787 | 8/1962 | Parks | 178—70 |

NEIL C. READ, *Primary Examiner.*

E. JAMES SAX, ROBERT H. ROSE, *Examiners.*

A. J. DUNN, T. A. ROBINSON *Assistant Examiners.*